United States Patent [19]
Best et al.

[11] 3,918,216
[45] Nov. 11, 1975

[54] TUBING SEVERING METHOD
[75] Inventors: Howard S. Best, Horseheads; Bruce A. Milliman, Elmira; Edward J. Zak, Corning, all of N.Y.
[73] Assignee: Corning Glass Works, Corning, N.Y.
[22] Filed: Mar. 17, 1975
[21] Appl. No.: 558,735

[52] U.S. Cl. .................. 51/283; 51/290; 51/327
[51] Int. Cl.² ............................................ B24B 1/02
[58] Field of Search ................. 51/283 R, 290, 327

[56] References Cited
UNITED STATES PATENTS

| | | | |
|---|---|---|---|
| 2,487,091 | 11/1949 | Barnes | 51/283 R |
| 2,579,108 | 12/1951 | Bock | 51/283 R UX |
| 2,760,314 | 8/1956 | Heibel | 51/283 R |
| 3,216,154 | 11/1965 | Christen | 51/283 R |
| 3,218,764 | 11/1965 | Deeren | 51/283 R |
| 3,852,917 | 12/1974 | McKown | 51/99 X |

*Primary Examiner*—Donald G. Kelly
*Attorney, Agent, or Firm*—Charles W. Gregg; Burton R. Turner; Clarence R. Patty, Jr.

[57] ABSTRACT

A method of cutting or severing tubing of a brittle material such as, for example, tubing of a glass, glass-ceramic or ceramic crystalline material which is subject to chipping, cracking or checking when severed or cut by heretofore known methods.

4 Claims, 3 Drawing Figures

TUBING SEVERING METHOD

BACKGROUND OF THE INVENTION

There is disclosed in U.S. Pat. Nos. 3,591,348; 3,650,703 and 3,687,633 methods of and apparatus for growing or producing bodies including tubes and tubing of a brittle crystalline material. Such tubes or tubing are often used for the manufacture of electric arc discharge lamps or tubes and, to such end, the tubes or tubing must be cut or severed to provide cut lengths of the desired length for such lamps. Oftentimes it is also desired to bevel the cut or severed ends of the tubes or tubing for the purpose of applying suitable cap members to the severed and beveled ends of the tubing.

Heretofore, the severing and beveling of tubing such as discussed above was performed by first clamping it, severing or cutting the clamped tubing with a rotating diamond cutting blade, disk or saw, and thereafter beveling the outer rim of each cut end. However, the material of the tubing made in accordance with any one of the aforesaid patents is a relatively brittle material and, during the severing operation or step, there is oftentimes excessive chipping, checking or cracking of the severed ends of the tubing thereby requiring undue or time consuming or lapping of such ends to remove the part thereof which was damaged by said checking, cracking or chipping. Accordingly, the herein disclosed method of severing cut lengths of tubing of a brittle material, such as a crystalline material for example, was developed to overcome said damaging of the ends of the cut lengths of material. The disclosed invention is not only applicable to tubing made in accordance with any of the aforesaid patents but is equally applicable to tubing of other brittle materials such as, for example, glass tubing made in accordance with U.S. Pat. No. 2,106,744.

SUMMARY OF THE INVENTION

In accomplishing the objects of the invention, the outer surface layer or skin of a rotating length of tubing is first selectively cut or ground away in a selected annular region thereof where such tubing is to be severed, such cutting or grinding being performed so as to provide in the tubing a shallow and smooth annular recess having beveled ends. The rotation of the length of tubing is then terminated and the tubing is clamped in a stationary position. The tubing then is cut and severed in, as near as practicable, the longitudinal center of said annular region, by passing a rotating diamond cutting disk, saw or blade through such region of the tubing, such cutting or severing providing two cut lengths of tubing having beveled cut ends similar to each other. The beveling or grinding of the tubing prior to severing or cutting thereof prevents or obviates the aforesaid chipping, cracking or checking of the tubing that oftentimes occurs when the severing step is performed first.

BRIEF DESCRIPTION OF THE DRAWINGS

Similar reference characters refer to similar parts in each of the figures of the drawings.

PREFERRED EMBODIMENTS OF THE INVENTION

Figure 1:
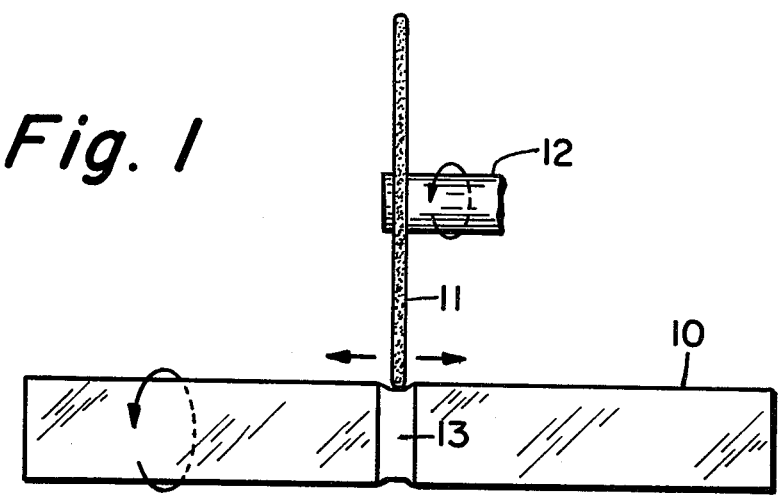
FIGS. 1 and 2 of the drawings schematically illustrate successive steps of severing and cutting cut lengths of tubing in accordance with the invention.

Referring to the drawings in detail, there is shown in FIG. 1 a length of tubing 10 of a glass, glass-ceramic, ceramic or similar brittle crystalline material which is to be severed by the method of the present invention. The length of tubing 10 is rotated about its longitudinal axis as indicated by the arrow in FIG. 1. Such rotation can be performed, for example, by a machine such as that shown in U.S. Pat. No. 3,077,095. While tubing 10 is being rotated the peripheral edge of a diamond cutting or grinding disk or wheel 11, which is mounted on a rotating axle or shaft 12, is brought into contact with a region of the tubing in which it is desired that the tubing be severed and the outer surface layer or skin of the material of the tubing in such region is thereby ground away to form a smooth shallow annular channel or recess such as 13 having beveled ends. To perform such grinding, axle 12 is reciprocatively moved slightly along its longitudinal axis, to impart lateral or similar movement to grinding wheel 11 (as indicated by the straight line arrows in FIG. 1) to thereby grind tubing 10 to form said annular recess or channel such as 13 in the outer surface layer of the tubing. The width and depth dimensions of the recess such as 13 in tubing 10 are somewhat exaggerated for purposes of clarity of illustration.

Figure 1A:
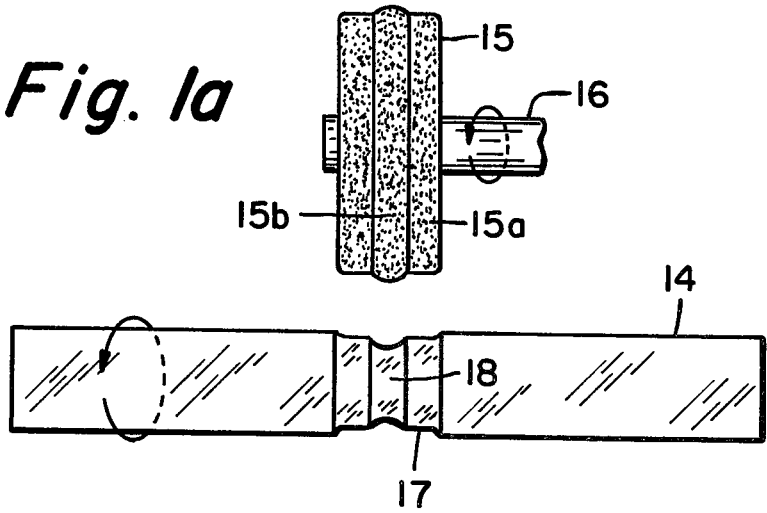
FIG. 1a schematically illustrates a step which, in practicing the invention disclosed, may be used as an alternative step to that illustrated in FIG. 1.

As previously mentioned, FIG. 1a illustrates an alternative step or manner of providing an annular recess or channel such as 18 in the outer layer or skin of a length of crystalline brittle tubing such as 14. In such alternative step, tubing 14 is rotated and, during such rotation, the outer periphery of a diamond grinding wheel 15, mounted on a rotating shaft or axle 16, is brought into contact with the rotating tubing 14 in the region thereof where it is desired to sever such tubing. Gringing wheel 15 has a relatively wide grinding edge 15a with a raised center portion 15b, that is, a center portion that is of a larger circumference than the remainder of grinding edge 15a, such center portion having an outer peripheral configuration corresponding to a channel or groove such as 18 which is to be ground into tubing 14 in the severance region thereof. When wheel 15 is brought into contact with tubing 14 for grinding thereof, such wheel not only grinds the desired channel such as 18 but also grinds regions such as 17 adjoining such channel and thereby provides for ends of tubing having different configurations than that provided by using the step illustrated in FIG. 1. No reciprocative lateral motion of wheel 15 is necessary since the outer periphery of center portion 15b of grinding edge 15a is shaped so as to impart the desired cross-sectional configuration to recess or channel 18 without any reciprocative motion such as is used in the step of FIG. 1. As in FIG. 1, the dimensions of recess 18 in tubing 14 of FIG. 1a are slightly exaggerated for purposes of clarity of illustration.

Figure 2:
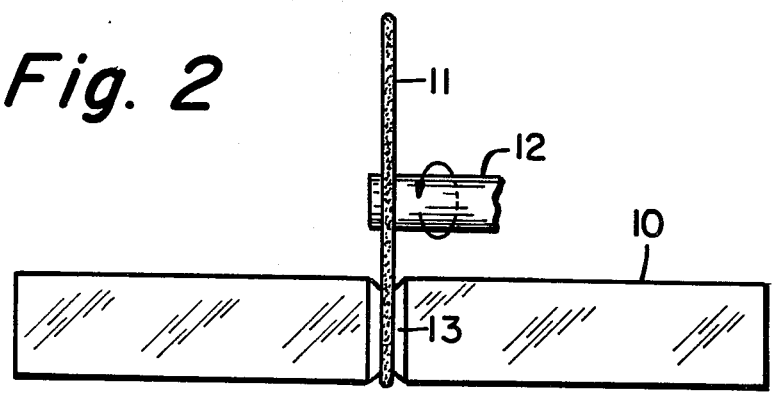

Following the grinding of channel or recess such as 13 in FIG. 1 (or 18 in FIG. 1a) the rotation of tubing 10 (or 14) is terminated and the tubing is clamped in any convenient manner to maintain the tubing in a stationary position. The cutting edge of a rotating cutting or severing disk, blade or saw, which may be the edge of wheel or disk 11 or the cutting edge of a similar wheel or disk, is then brought into contact with the tubing in the center of recess 13 in tubing 10 (or 18 in tubing 14 of FIG. 1a) and such cutting edge is then moved completely through the tubing to sever it into two lengths of tubing having similar cut and beveled ends as illustrated in FIG. 2.

The method of cutting tubing as disclosed herein provides selected lengths of tubing which do not require any additional beveling or lapping of the cut ends of the cut lengths. The reason that the grinding of a recess such as 13 in tubing 10 (or 18 in tubing 14) prior to severing the tubing makes for producing cut lengths having smooth cut ends is not entirely understood. However, it is believed that, although tubing of brittle materials such as those hereinbefore discussed have an outer skin or surface layer which is smooth to the sight and touch, in actuality, such outer skin or layer is relatively rough and, therefore, if the cutting edge of a severing disk, blade or saw is brought into contact with such outer skin or surface layer and moved through the tubing for cutting thereof, considerable chipping, checking or cracking occurs due to such cutting edge catching on the high points or ridges of said surface layer or skin. The grinding of a beveled recess in the surface layer or skin of the outer periphery of tubing such as that mentioned removes said relatively rough skin or outer layer and provides a relatively smooth surface to be contacted by the cutting edge of the severing disk or blade thereby eliminating said catching of the cutting edge on said high points or ridges such as exist on the outer skin or surface layer of tubing of the type discussed.

Although there is herein illustrated and described only two embodiments of the tubing severing method comprising the invention, it will be understood that, in practicing the invention disclosed, various minor changes may be made therein within the scope of the appended claims without departing from the spirit and scope thereof.

We claim:

1. The method of severing tubing of a relatively brittle material, such 4ethod comprising the steps of;
   I. rotating a length of said tubing about its longitudinal axis,
   II. grinding the outer surface layer from said length of tubing in a selected annular region thereof to provide a smooth shallow annular recess therein having beveled ends,
   III. terminating rotation of said length of tubing and clamping it in a stationary position, and
   IV. cutting through said length of clamped tubing in the center of said annular recess to provide two lengths of tubing having beveled cut ends similar to each other.

2. A method in accordance with claim 1 and in which said material of said tubing is a brittle crystalline material.

3. The method of severing tubing of a brittle material, such method comprising the steps of;
   I. rotating a length of said tubing about its longitudinal axis,
   II. contacting an annular region of said rotating length of tubing with the peripheral surface of a rotating grinding wheel, such surface including beveled edges to provide in said annular region a smooth shallow annular recess having beveled ends,
   III. terminating rotation of said length of tubing and clamping it against movement, and
   IV. passing the cutting edge of a rotating cutting disk through the center of said annular region of said length of clamped tubing to provide two cut lengths of tubing having similarly ground and beveled cut ends.

4. A method in accordance with claim 3 and in which said material of said tubing is a brittle crystalline material.

* * * * *